(12) United States Patent
Murphy et al.

(10) Patent No.: US 12,505,195 B2
(45) Date of Patent: Dec. 23, 2025

(54) AUXILIARY DEVICE AUTHENTICATION SYSTEM AND METHOD

(71) Applicant: Sony Interactive Entertainment Inc., Tokyo (JP)

(72) Inventors: Alan Murphy, London (GB); Jason Craig Millson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 77 days.

(21) Appl. No.: 18/631,299

(22) Filed: Apr. 10, 2024

(65) Prior Publication Data

US 2024/0362315 A1 Oct. 31, 2024

(30) Foreign Application Priority Data

Apr. 27, 2023 (GB) ..................................... 2306205

(51) Int. Cl.
*G06F 21/36* (2013.01)
*A63F 13/73* (2014.01)
(Continued)

(52) U.S. Cl.
CPC ............... *G06F 21/36* (2013.01); *A63F 13/73* (2014.09); *G06F 21/34* (2013.01); *G06F 21/64* (2013.01)

(58) Field of Classification Search
CPC .. A63F 13/213; A63F 13/70–73; A63F 13/79; G06F 21/34–35; G06F 21/36;
(Continued)

(56) References Cited

U.S. PATENT DOCUMENTS

| | | |
|---|---|---|
| 10,210,502 B2 | 2/2019 | Filler |
| 10,218,506 B1 | 2/2019 | Bhabbur |

(Continued)

FOREIGN PATENT DOCUMENTS

CN 113362514 A 9/2021

OTHER PUBLICATIONS

Extended European Search Report for corresponding EP Application No. 24165220, 10 pages, dated Jun. 7, 2024.

(Continued)

*Primary Examiner* — Kevin Bechtel
(74) *Attorney, Agent, or Firm* — Fish & Richardson P.C.

(57) ABSTRACT

A system for performing a login process for a user profile at an auxiliary device, the system comprising a first obtaining unit configured to obtain information associated with each of a plurality of image frames displayed by a first device, the first device being logged in with the user profile, a second obtaining unit configured to obtain a plurality of images captured by a camera associated with the auxiliary device, a comparison unit configured to compare the information associated with plurality of image frames displayed by the first device with a plurality of corresponding images captured by the camera to identify a degree of similarity for each corresponding image pair, wherein corresponding images are those associated with a same respective display and capture time, and an authentication unit configured to execute a login to the auxiliary device with the user profile in response to a determination that the degree of similarity meets or exceeds a threshold value for at least a subset of the plurality of corresponding image pairs.

13 Claims, 4 Drawing Sheets

(51) Int. Cl.
*G06F 21/34* (2013.01)
*G06F 21/64* (2013.01)

(58) Field of Classification Search
CPC . G06F 21/44–445; G06F 21/45; H04L 63/08; H04L 63/0853
See application file for complete search history.

(56) References Cited

U.S. PATENT DOCUMENTS

| | | |
|---|---|---|
| 11,171,958 B1 | 11/2021 | Davey |
| 2015/0350520 A1 | 12/2015 | Yamashita |
| 2016/0249216 A1* | 8/2016 | Glazer ................. G06F 3/1454 |
| 2016/0371475 A1 | 12/2016 | Zhao |
| 2022/0006813 A1* | 1/2022 | Jorasch ................. G16H 50/30 |
| 2022/0292917 A1* | 9/2022 | Shepherd ............. G06V 40/172 |
| 2023/0052463 A1* | 2/2023 | Spivack ............... G07D 7/0043 |

OTHER PUBLICATIONS

Github: https://github.com/opencv/opencv/commit/f46e2b67ecb824d5175ad55a36484e58129091bae, 9 pages, dated Apr. 26, 2023. (For relevancy, see Non-Pat. Lit. #1.).
Combined Search and Eamination Rpeort for corresponding GB Application No. GB2306205.2, 5 pages, dated Oct. 25, 2023.

\* cited by examiner

AUXILIARY DEVICE AUTHENTICATION SYSTEM AND METHOD

BACKGROUND OF THE INVENTION

Field of the Invention

This disclosure relates to an auxiliary device authentication system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years in particular there has been an increase in the number of devices and peripherals available to a user of an entertainment device, such as a games console. While in many cases these may be provided in a fashion that is easily integrated with such a device (such as a games controller to control interactions with a games console), in other cases these may be entirely separate devices that provide supplementary functions. For example, a user may be able to use a mobile phone or a tablet to access supplementary content such as character information for a movie or a mini-map for a game.

While in some cases the use of additional devices or peripherals may be streamlined so as to require minimal user inputs to function, in other cases a user may be required to login to a personal account or perform configuration of a device to enable the use. This process may be particularly laborious in the case in which personal data is used (such as progression in a game, or if a subscription is required), as this may require security verification or the like to protect a user's personal information.

One approach to manage this in a streamlined fashion is to use a QR code or other visual pattern for verifying a user's identity. For instance, when logging into a device a device-specific QR code may be scanned by a different device which is already logged in to a user's account; similarly, the QR code may be displayed by the logged-in device for viewing by the device which is not logged in. However, this can often interfere with the user's experience of content as the display of this interferes with the display of the user's desired content; it is also considered that screenshots or captured images of the QR code can easily be used to circumvent the security measures, thereby impacting the safety of a user's personal information.

It is in the context of the above discussion that the present disclosure arises.

SUMMARY OF THE INVENTION

This disclosure is defined by claim 1. Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present disclosure are described.

Figure 1:
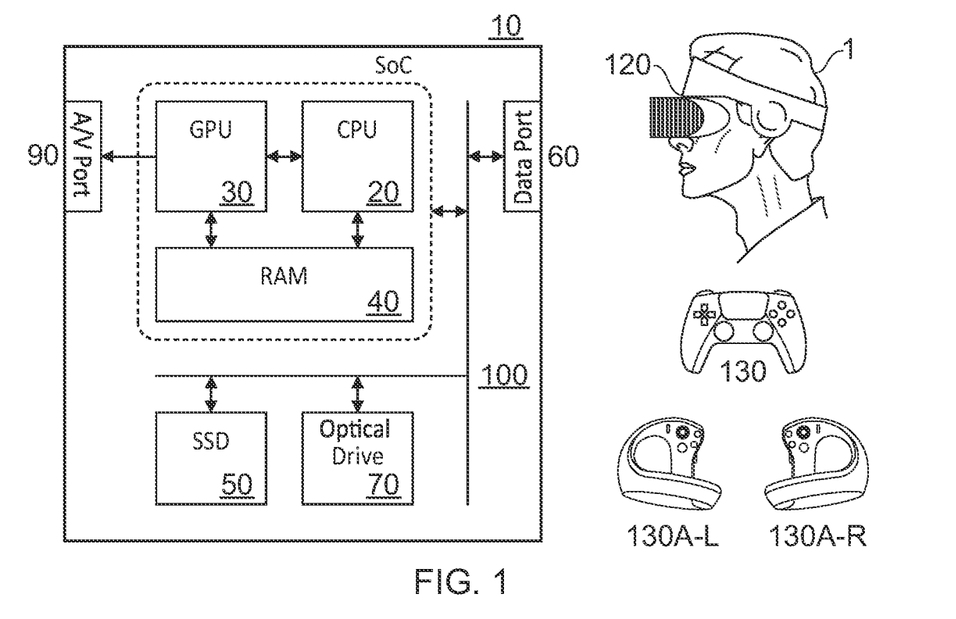
FIG. 1 schematically illustrates an exemplary entertainment system.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment system is a head mounted display 'HMD' 120, such as the PlayStation VR 2 'PSVR2', worn by a user 1.

Where components are not integrated, they may be connected as appropriate either by a dedicated data link or via a bus 100.

Interaction with the system is typically provided using one or more handheld controllers (130, 130A), such as the DualSense® controller (130) in the case of the PS5, and/or one or more VR controllers (130A-L,R) in the case of the HMD.

As discussed above, image-based authentication of users/devices can often be inconvenient as well as being subject to concerns over security. Such issues are addressed by implementations of the present disclosure through the consideration of the content that is associated with an already-authenticated device, such as a game that is being played, rather than a static image generated specifically for the purpose of authentication. This can enable a more immersive and secure authentication process for the user of an auxiliary device, such as a mobile phone.

A mobile phone is an example of an auxiliary device which can offer additional functionality to the user in respect of the content associated with the entertainment device through the execution of a companion application or the like. For example, additional information may be provided (such as a mini-map or information about in-game items) or the ability to interact with content in a new or modified way—for example, setting tasks for a player or controlling an element in the content directly. In some implementations, the authentication process may be incorporated into a companion application or the like, or may be handled by a standalone application which authenticates the device itself.

Other auxiliary devices, such as game controllers or HMDs, may be used as input/output devices with the entertainment device. While these may not be required to be logged in for them to function, in some cases it may be advantageous; for instance, such auxiliary devices may store local user profiles to adapt their functionality (such as changing adaptive trigger settings) in a manner that can aid compatibility when using the device with other content-providing devices.

Figure 2:
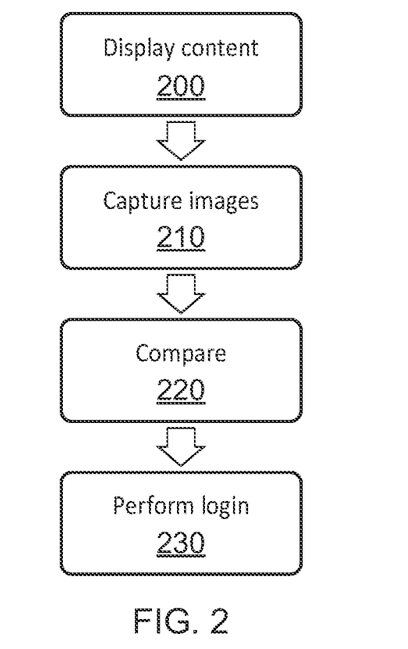
FIG. 2 schematically illustrates a method for logging in auxiliary devices.

FIG. 2 schematically illustrates a method for logging in auxiliary devices in accordance with the present disclosure.

A step 200 comprises displaying content via a device associated with the provision of content to a user; this may include the entertainment device of FIG. 1, for example, or any suitable processing device. For instance, a smart TV, a games console, a personal computer, a mobile phone, a tablet computer, or any other device which is operable to output content for display to a user. It is considered that the user is already signed into this device with a user profile, so as to associate their profile or account with the device. Examples of content include video games, television programmes, and movies—although any content comprising a video component may be considered appropriate.

A step 210 comprises capturing a plurality of images of the displayed content using a camera associated with an auxiliary device. For instance, if the auxiliary device is a mobile phone or HMD this may use an integrated camera directed towards the display showing the content; similarly, for other devices a camera accessory may be connected to the device for capturing the images if an integrated camera is not available. The plurality of images may be a sequence of images of the displayed content (such as capturing a number of sequential image frames of the content) or a number of images representing a sampling of the displayed content at a predetermined interval. This sampling may be regular (every $n^{th}$ frame) or irregular (such as a prescribed list of frame numbers or image capture intervals). In some cases, it may be advantageous to forgo a predefined sampling and to instead simply obtain a plurality of image frames from each source and perform processing to determine if there is a match between any of those obtained frames—this can address issues with identifying which frames should be compared which can arise with irregular latency or the like associated with a lower-quality internet connection.

A step 220 comprises a comparison between the content displayed in step 200 and the plurality of images captured in step 210 to identify whether there is a match between them. This comparison may be based upon frame-matching, feature-matching, or a consideration of what is shown in the images—such as a game state, or particular characters being present on the screen. Examples of the comparison are discussed in more detail below.

A step 230 comprises the performing of a login process on the auxiliary device in response to the comparison of step 220 indicating that the displayed and imaged content is the same. This login process is performed in a manner that enables a user to omit the provision of at least a password, and optionally further details such as account name or security code that may typically be requested during a login process.

In accordance with this method, a login process for an auxiliary device is realised in which a user is not required to input their password manually. This can increase the efficiency of the login process, particularly in the case in which a user is also able to omit the input of other login details, as well as the security of the login process as a user may no longer feel incentivised to use a shorter (and therefore weaker) password to achieve an improved efficiency of the login process.

A number of different features may be considered when implementing such method so as to increase the efficiency and/or security of the process.

A first example of this is requiring that at least a threshold difference between the captured images is able to be observed before a login process can be completed. This can prevent a series of static frames being used for the comparison, which may lead to a reduction in the security of the login process as this may be easier to spoof than a number of images captured of more dynamic content. This threshold difference may be based upon any suitable analysis of the content, including a comparison of the positions of one or more features in the captured images, a comparison of the number of features shared by the captured images, or a determination of motion vectors between the captured images. This may be implemented by requiring that the images are captured of live gameplay by a user (with at least a threshold amount of action in the gameplay) rather than simply a static menu screen.

Alternatively, or in addition to the above, it may be required that at least a threshold number of inputs are being provided to the games console (or other already-authenticated device) in order for the login process to be executed. For instance, a user may be required to provide at least x inputs per second during the login process in order to ensure that there would be sufficient variance between frames. In some cases, it may be further considered that the threshold applies to particular inputs (such as inputs to control motion or otherwise cause a significant effect on the content that is displayed, such as casting a spell or attacking an enemy).

While in some cases the login process may be performed using whichever content is being displayed by the logged-in device, in some cases the efficiency of the authentication may be improved if a standardised login application is provided for a user to interact with. For example, a mini-game or the like may be played by a user with a scripting (such as for enemy actions or environmental changes) which is known so as to aid with identifying whether there is a match between the images; this scripting may be user-specific and/or random to some degree, so as to avoid overlap with other users' gameplay, as well as optionally relying upon user-specific assets (such as an avatar associated with the user account, or by incorporating user preferences for colours and/or objects). These assets may be imported from a user's favoured games, for example, or otherwise associated with them (such as featuring alternative models of characters from those games) to aid personalisation.

Alternatively, or in addition, verification frames or features may be added to the user's content to assist with the authentication process. This may be advantageous in that the user's content may be personalised further, potentially without the user noticing, so as to distinguish the captured images from those captured of another user's content which may be similar. Examples of such verification frames/features include content such as a personalised QR code or other visual identifier that is linked to that user's account (either specific to that login attempt, or persistent for a number of login attempts), or features such as recoloured objects or passphrases being integrated into content. Any visual modification/feature may be considered appropriate if it causes a deviation from the display of content for another user and/or a user who is not attempting to log in to an auxiliary device. These features may be static or dynamic as desired. The authentication may comprise multiple passes. For example, a first authentication may occur from step 220, after which a second authentication pass may be triggered. The second authentication may involve displaying verification frames on the screen and checking whether the verification frames are detected in the captured images. Where the process includes multiple passes, it may stipulate a predetermined threshold timespan within which the first and second (and any multiple) passes of authentication are completed in order to allow login.

Similarly, a user may be able to specify a particular area of the display or a feature to be used for the verification process; this can add an additional layer of security to the process, as an uninformed user attempting to gain access to the account may be unaware of which portion of the display to focus upon with the image capture. In some implementations this may be in the form of a specified region or coordinates, while in others specific features may be defined. Information about the portion of the display to be imaged may be stored in a user profile as a user preference, or may be specified by an application on the signed-in device or auxiliary device such that it may vary over time.

In some implementations, the login process may be performed without a user having to specifically indicate that this is the case on the content-providing device; this can make the login process less burdensome for that user. In such a case, the content-providing device may instead receive a request for authentication from the auxiliary device (either directly, or via a server) to output information about the content to enable the authentication to be performed. Alternatively, the user may be required to initiate the login process via a particular key press or selection of a menu item or the like. Whilst potentially more burdensome for the user, such a feature may be considered advantageous for increasing security for the user—particularly in the case in which they consume content in public using a portable device, thereby rendering the display visible to a number of potential other users.

In some examples, audio may also be used to provide an additional layer of authentication. The authenticated device may output (through a TV screen or connected external speakers, for example) audio. The audio may be related to the content currently being output from the authenticated device, or alternatively the audio may be a verification sound used specifically for authentication purposes. The auxiliary device may comprise a microphone input through which the audio can be detected and obtained. Specific sounds and audio output by the authenticated device may be tied to specific visual frames also output by the authenticated device. Audio obtained by the microphone may be compared against the known audio output from the authenticated device to provide another layer of authentication.

Further examples of modifications and optional features are described below, in the context of more specific implementations. However, it is noted that these features may be used in any suitable implementation as appropriate rather than being limited only to the implementations in the context of which the features are discussed.

Figure 3:
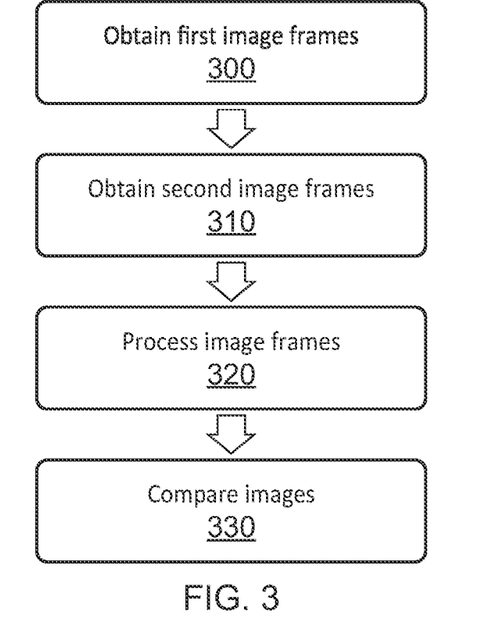
FIG. 3 schematically illustrates a method in accordance with FIG. 2, in which the comparison comprises a frame- or feature-matching process.

FIG. 3 schematically illustrates a method in accordance with FIG. 2, in which the comparison comprises a frame- or feature-matching process. In other words, this method relies upon a comparison of the displayed and captured image, portions of those images, representations of those images, or identified features within those images. This comparison may be performed by any suitable device; in some cases, the logged-in device may perform the comparison, while in others a server which hosts a user account or the device logging in may perform the comparison.

A step 300 comprises obtaining a plurality of image frames displayed at the authenticated (that is, logged in) device, such as a games console. A video which comprises the frames to be used for authentication as well as other image frames may be obtained, for example, or the frames to be used for authentication may be separated from the rest of the output video. For instance, a system-level function of a games console may be configured to obtain the image frames used for the authentication from the video that is output to the display.

A step 310 comprises obtaining a plurality of image frames captured by a camera of the auxiliary device, or another camera otherwise associated with that device. As in step 300, a video which comprises the frames to be used for authentication as well as other image frames may be obtained, for example, or the frames to be used for authentication may be separated from the rest of the output video. In some implementations, the plurality of captured image frames may include a reference image or the like to enable the correct authentication frames to be identified easily.

An optional step 320 comprises processing one or more of the images obtained in steps 300 and/or 310. This image processing may comprise any suitable processing to aid the comparison of the images—for example, recolouring, resizing, and/or warping (to account for a camera position relative to the display, for instance, or artefacts introduced by the camera imaging). In some implementations one or both of the images may be cropped or masked so as to isolate particular image features to be compared.

In some implementations, the image processing may comprise the generation of representations of the obtained images; for instance, generating an average image from those obtained in step 300 and (separately) from those obtained in step 310. These average images can then be used for the comparison step, resulting in a single comparison being performed rather than a plurality of comparisons between images. Other representations may include performing an edge detection process for an image and using this as the basis for comparison, or any other processing which can lead to a more efficient and/or effective comparison between images.

A step 330 comprises a comparison of at least a subset of the images obtained in steps 300 and 310, or the processed images of step 320 if implemented. A threshold level of matching between the images may be specified for the authentication/login process to be successful, for instance based upon a number of pixels (or larger features) that match between images, or any other measure of the similarity between images. This threshold may be user-defined, and/or may be dependent upon the level of access to be provided to the auxiliary device (such that basic access, such as read-only access to profile information, requires a lower threshold).

In response to a positive comparison (that is, a determination that there is at least a threshold similarity between the displayed and captured images), the auxiliary device may be logged into a user account or otherwise authenticated.

In some cases, the authentication process may be modified so as to tailor the process towards a particular auxiliary device and/or camera associated with that device. This can enable technical limitations to be addressed, improving the robustness of the login process. For example, if the auxiliary device has a camera having a frame rate that is different to the refresh rate of the display which presents the content to the viewer, changes may be made to the selection of authentication image frames. For example, if a 30 frames-per-second camera is used to image a display that shows 60 frames-per-second then only half of the displayed image frames are able to be captured by the camera—and therefore without a selection of authentication frames to account for this the authentication process may fail.

Similarly, other properties of the camera may be considered that can be used to inform the selection of authentication images—such as low-light performance (avoid using image frames which are too dark), resolution (avoid using image frames which comprise particularly small or detailed features), and/or colour sensitivity (avoid using image frames which comprise a number of similar colours).

Figure 4:
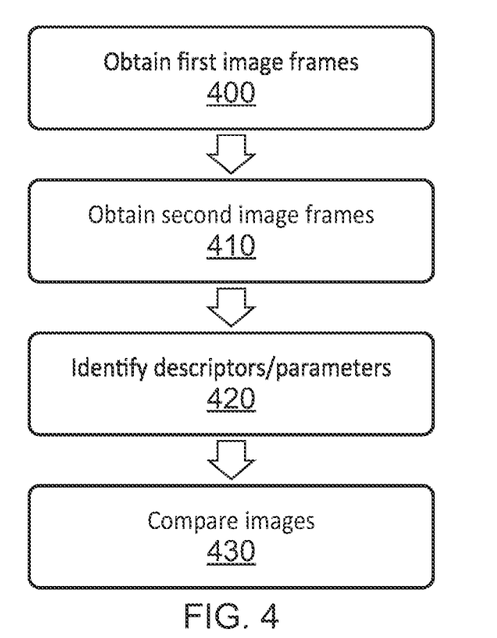
FIG. 4 schematically illustrates a method in accordance with FIG. 2, in which the comparison comprises a matching of the state shown in the content.

FIG. 4 schematically illustrates a method in accordance with FIG. 2, in which the comparison comprises a matching of the state shown in the content. In other words, this method relies upon a determination of a game state or otherwise assessing content to identify one or more descriptors to represent an image frame.

A step 400 comprises obtaining a plurality of image frames displayed at the authenticated (that is, logged in) device. This may be performed in the same manner as step 300 described above with reference to FIG. 3. In some implementations, it may be considered advantageous to also capture metadata which is indicative of the content of the image if such data is available at the device; this may assist with determining the game state associated with the image frame.

Alternatively, or in addition, the step 400 may comprise obtaining a respective game state associated with each of a plurality of image frames, and/or one or more descriptors and/or parameters. These descriptors and/or parameters may be obtained from the game state, rather than output directly, and are considered to be indicative of one or more features that would be present in the displayed content. For example, parameters may include a user's current health, enemies being encountered, relative locations of objects, objects being engaged with, a user's current equipment, and a user's current orientation within the virtual environment. In other words, the descriptors and/or parameters may be any information that is used to characterise or describe the game state.

A step 410 comprises obtaining a plurality of image frames captured by a camera of the auxiliary device, or another camera otherwise associated with that device. This step may be performed in the same manner as step 310 described above with reference to FIG. 4.

A step 420 comprises processing one or more of the images obtained in steps 400 and 410 to identify one or more descriptors or parameters representing the content of the images; of course, this step may be skipped in respect of the images of step 400 if they are not obtained due to a game state or the like being obtained instead. The processing may comprise a feature recognition process to identify one or more content-specific elements and an associated context (such as a location relative to the player's avatar), for example. This may be implemented using a trained machine learning model, for example, which is trained to identify one or more descriptors and/or parameters from an image.

A step 430 comprises a comparison of at least some of the descriptors and/or parameters obtained in step 420 to identify whether the images represent the same content. In other words, descriptors and/or parameters associated with each of the corresponding image frames (that is, image frames associated with the same time obtained by each of steps 400 and 410) may be cross-referenced to determine whether the same game state is being represented by each of the corresponding image frames.

In some implementations, the method of FIG. 4 may be adapted such that rather than performing a direct comparison of the descriptors and/or parameters an identification and search/confirmation is performed. That is to say that the descriptors and/or parameters may be obtained for a first image or images (such as the content displayed by the logged-in device), and then a second image or images (such as the images captured by the camera) can be analysed to determine whether the same descriptors and/or parameters are represented by those images. This may be more efficient that identifying the descriptors/parameters in those second images, as the image processing may be more targeted.

Figure 5:
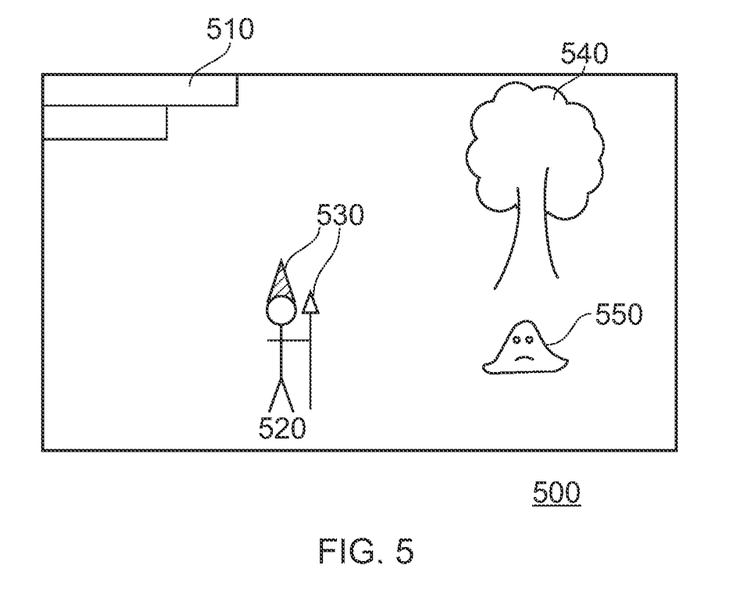
FIG. 5 schematically illustrates an exemplary image frame of displayed content.

FIG. 5 schematically illustrates an exemplary image frame 500 of displayed content, in which the displayed content is a video game. Within this image, a number of features are present which can be considered as part of a feature- or frame-matching process, or can be used to derive one or more descriptors and/or parameters indicative of a game state corresponding to the image frame.

The image frame 500 comprises user status bars 510; these may be indicative of a user's current health, energy, or any other variable. Such features may therefore be useful in that if a game state output by the system comprises health values (or the like), then the captured images can be examined to identify if the health values in the captured image match those prescribed by the game state. In some games, these status bars may have dynamic visual effects (such as a pulsing or a moving pattern) which can allow for frames to be distinguished from one another in respect of these features even if the values do not change.

The image frame 500 also comprises a player character 520. A range of information relating to the character 520 can be identified from the image—this can include a location of the character 520 in the virtual environment, one or more pieces of equipment 530 used by the character 520 (such as a particular weapon or hat), and a pose or action being executed by the character 520. Each of these characteristics can therefore be used to compare image frames (such as confirming that the character has the same pose and equipment in each image frame) or game states corresponding to those image frames.

The image frame 500 also comprises scenery 540 (in this case, represented by a tree) which can be used to identify a camera viewpoint location and/or orientation within the environment, or to otherwise be used in feature-mapping between image frames. The scenery 540 may include any objects in the scene—these can be objects able to be interacted with by a user, or background objects that are provided primarily for aesthetic purposes.

The image frame 500 also comprises an enemy 550; this can be indicative of a game state, particularly if the enemy 550 is displayed with an associated health bar or the like to convey further information. In particular, the enemy's location may be useful to identify the camera viewpoint; in some cases, enemies may be associated with particular biomes or in-game levels/areas so as to be indicative of a virtual environment in which the character is present.

Other examples of image features that could be present and usable for the matching processes described above are further HUD (heads-up display) elements, such as mission details, overlaid text (such as information about in-game events), and names associated with other players (often displayed above a corresponding character).

Figure 6:
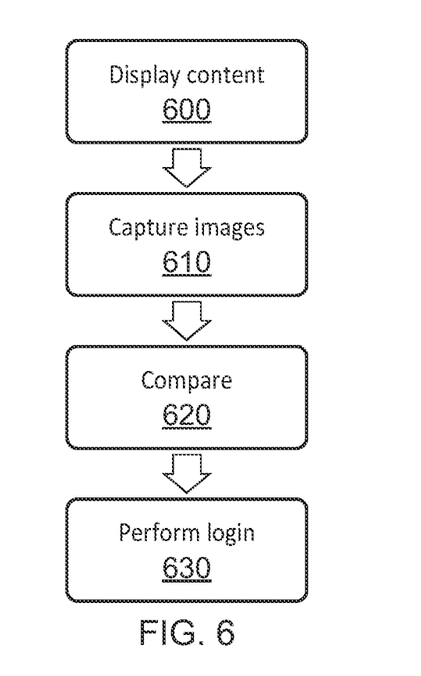
FIG. 6 schematically illustrates a further approach in line with the method of FIG. 2.

FIG. 6 schematically illustrates a further approach in line with the method of FIG. 2. In this case, rather than performing a login process for the auxiliary device it is considered that the auxiliary device is already logged in. In accordance with this, the authentication process is therefore performed for the content-providing device, such as a games console. For example, if a user is logged into their phone then they can use a process in accordance with this described method to enable a login at a games console.

Steps 600 and 610 may be performed in accordance with steps 200 and 210 described with reference to FIG. 2 above; the main distinction is that the device displaying the content is not logged in while the device capturing the images (or associated with a camera that captures the images) is logged in.

In some implementations, the content-providing device may be configured to display an identifier, such as an IP address or an element associated with a particular user profile (such as the username of a profile associated with a login attempt).

In some implementations, the displayed content may be predefined such that the auxiliary device is able to know in advance what content is expected to be displayed by the content-providing device. For instance, at the end of a gameplay session of a logged-in user a summary video of the user's gameplay may be generated and stored locally at the console as well as transferred (or otherwise made available) to the auxiliary device—this video can then be displayed by the content-providing device as a dual-purpose refresher of a previous game session and login step. Alternatively, or in addition, a user may pre-define a login sequence which requires them to perform certain actions in a game (or other application) which can be used to authenticate them—this may be easier for a user to remember than a long password, and can be more engaging to provide as an input.

The comparison step 620 in this implementation may be reversed in that it is the captured image frames that are used as the reference frames as these are the frames that are associated with the authenticated user device. However, this is not a requirement of the present method.

The step 630 comprises logging-in the content-providing device in response to a positive outcome of the comparison step.

Such a method may be advantageous in that a user may already have a streamlined login process associated with an auxiliary device—such as a biometric login, or an installed password manager which saves the user's credentials. This efficient login can therefore be extended to another device which does not offer the same functionality.

Figure 7:
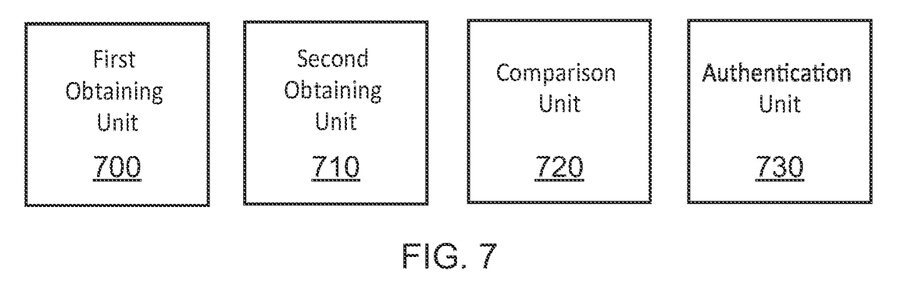
FIG. 7 schematically illustrates a system for performing a login process for a user profile at an auxiliary device.

FIG. 7 schematically illustrates a system for performing a login process for a user profile at an auxiliary device. The system comprises a first obtaining unit 700, a second obtaining unit 710, a comparison unit 720, and an authentication unit 730. These functional units may be implemented using any suitable hardware; for instance, they may be implemented by the CPU and/or GPU of the device 10 of FIG. 1, or a server (such as a server which hosts the user account or profile, or otherwise provides functionality in dependence upon those).

In a number of implementations the functionality of these units may be realised by a combination of devices—such as a games console, server, and auxiliary device (such as a mobile phone) each performing at least some of the functions of the system using respective processing units (such as CPUs and/or GPUs). For instance, the first obtaining unit 700 may be implemented using a CPU located at a games console while the second obtaining unit 710 may be implemented using a CPU located at a mobile phone, with the obtained images/information relating to those images being transmitted to an authentication server which performs the comparison and authentication processing associated with the comparison unit 720 and the authentication unit 730.

The first obtaining unit 700 is configured to obtain information associated with each of a plurality of image frames displayed by a first device, the first device being logged in with the user profile. For instance, this may include sampling a number of consecutive or non-consecutive frames as they are output for display; alternatively, or in addition, information about the displayed frames or their contents (such as an indication of which features are displayed or a current game state at the time corresponding to the image frame) may be obtained. Any suitable sampling pattern for the plurality of image frames may be considered; this can include sampling every $n^{th}$ frame (where n is any integer), a frame every n seconds (where n is any positive number), or sampling in accordance with a predefined sampling scheme or pattern.

As noted above, the first obtaining unit 700 may be configured to obtain the plurality of image frames as the information associated with each of the plurality of image frames; however any other information regarding the frames may also (or instead) be identified rather than being limited only to entire image frames. In some embodiments, the information may be a predetermined portion of a predetermined selection of the image frames in accordance with a sampling scheme.

The plurality of image frames may be associated with a video game as an example of the content that is being displayed. However, any suitable video content may be considered appropriate—the only requirement is that it is possible to obtain a plurality of image frames from the content, and that at least a subset of these frames are different enough to enable a secure user authentication process to be performed. In other words, any non-static content may be appropriate. In some implementations, the plurality of image frames displayed by the first device may comprise one or more identifiers associated with the user profile—for instance, a user-specific information (such as a profile name or picture, or an animated avatar associated with the user profile) may be displayed to further personalise the displayed content. This can further improve the security of this function, as other users would not have access to this data in a manner that is easily displayed and as such fraudulent login attempts may be less likely to succeed.

The second obtaining unit 710 is configured to obtain a plurality of images captured by a camera associated with the auxiliary device. The camera may be integrated with the auxiliary device, or may be associated with is such that it is a standalone camera which transmits images to the auxiliary device via a wired or wireless connection. In some implementations the second obtaining unit 710 captures images only corresponding to those for which information is obtained by the first obtaining unit 700, for instance by capturing images in accordance with a shared sampling scheme. However, it may be preferable in some cases to instead capture a number of consecutive frames and then to analyse these to extract the images of interest (that is, the images corresponding to those for which information is obtained by the first obtaining unit 700).

It is noted that the captured images may not directly correspond to the displayed images, and as such only parts of the captured images may be used (or processing may be used to remove excess image data). For instance, a captured image may include the frame surrounding the display area of a television or even parts of the room in which the display is present. It is also considered that the captured images may comprise the display area at an angle relative to the camera; this can lead to visual distortions such as key stoning. It is therefore considered that processing may be performed so as to mitigate these distortions. Further processing may also be provided to modify the colours, contrast levels, brightness, or any other aspects of the captured images.

The comparison unit 720 is configured to compare the information associated with plurality of image frames displayed by the first device with a plurality of corresponding images captured by the camera to identify a degree of similarity for each corresponding image pair, wherein corresponding images are those associated with a same respective display and capture time. A corresponding image pair refers to an image displayed at a particular time, and an image captured at that same time—in other words, the corresponding pair should comprise two representations of the same displayed image (or information relating to that image). The degree of similarity may be indicated using any suitable scale, and any suitable grading—this may be defined on a per-content or per-user basis, for example. The purpose of this feature is to quantify similarity between the images, and as such any approach may be suitable insofar as a number of erroneous or failed authentications can be reduced to a low value.

In some implementations, the degree of similarity is determined on the basis of the number of pixels that match between corresponding images; alternatively, or in addition, the degree of similarity may be determined on the basis of the number of image features that match between corresponding images. Examples of image features include the presence of any of the features discussed with reference to FIG. 5, for example, as well as their locations and poses within the display area.

In other words, the function of the comparison unit 720 is to determine whether the captured images match the displayed images—if there is a match, then it is considered that the user of the device displaying the images (who is already authenticated at that device) is also the user of the device capturing the images of those displayed images (and as such should also be authenticated at the auxiliary device).

In some cases, rather than comparing images on a per-pair basis for a plurality of image pairs, representative images may be generated which can be compared more efficiently. For instance, an averaging of a plurality of corresponding image pairs (the average being generated using the frames associated with a particular image source) may be performed to obtain a pair of averaged images to be compared (or any suitable number of pairs, the number being smaller than the initial plurality of image pairs). Similarly, difference images between respective images of the plurality of image pairs may be used for comparison, as these may eliminate a number of static features (and as such leave fewer features to compare).

Rather than being limited to a direct comparison between images, it is also considered that alternative approaches to confirming that the content is the same may be adopted. For instance, information about the game state at a displayed device at a given time may be used—if a captured image shows elements in a configuration which matches that expected from the known game state, then it can be considered that there is a sufficient degree of similarity.

The authentication unit 730 is configured to execute a login to the auxiliary device with the user profile in response to a determination that the degree of similarity meets or exceeds a threshold value for at least a subset of the plurality of corresponding image pairs. For instance, if the number of pixels or features that match between images is 98% or higher then a login may be approved—although any suitable threshold may be defined as appropriate for a given implementation.

In some implementations, the authentication unit 730 is configured to select a threshold in dependence upon a level of access to the user profile that is requested. If the login simply allows a user to view public information, then the threshold may be significantly lower—alternatively, a higher threshold may be set if it enables access to features such as billing or a password change.

In some implementations, the authentication unit 730 is configured to execute a login to the auxiliary device with the user profile in dependence upon a determination that the degree of difference between the plurality of image frames displayed by the first device is equal to or above a threshold value. In other words, it may be required that at least a threshold amount of change between the sampled image frames is present for the authentication process to be successfully completed. This can prevent a set of static image frames being used for authentication, which can lower the security of the login process.

In response to a failure to login due to this threshold not being met, a user can be requested to cause more motion between image frames during a subsequent login attempt—for instance, by instructing a task to be completed or buttons to be pressed.

In some implementations, the first obtaining unit 700 is configured to obtain a game state associated with each of the plurality of image frames, and/or one or more descriptors and/or parameters representative of the game state, instead of (or in addition to) obtaining image frames. In accordance with this, the comparison unit 720 may be configured to identify a game state, and/or one or more descriptors and/or parameters representative of the game state, associated with each of the plurality of images captured by the camera. A game state may include any information which characterises the content, with examples of descriptors and parameters including a user's health, load-out, opponents being faced, or any other variables.

In a number of implementations it may be considered advantageous to modify the number of image frames in the plurality of image frames so as to be dependent upon a network connection associated with either or both of the first device and the auxiliary device. In the case of a connection with a high latency, the number of frames can be increased—this can make it more likely that there is an overlap in the captured and displayed images, as a process which was too selective (that is, attempting to only obtain the minimum number of sample frames) may omit frames due to latency issues.

One exemplary arrangement of devices for implementing the functionality described above is one in which the auxiliary device is a mobile phone or tablet computer, and the first device is a games console. In addition to this, one or more servers may be involved as a part of the authentication process.

The arrangement of FIG. 7 is an example of a processor (for example, a GPU, TPU, and/or CPU located in a games console or any other computing device) that is operable to perform a login process for a user profile at an auxiliary device, and in particular is operable to: obtain information associated with each of a plurality of image frames displayed by a first device, the first device being logged in with the user profile; obtain a plurality of images captured by a camera associated with the auxiliary device; compare the information associated with plurality of image frames displayed by the first device with a plurality of corresponding images captured by the camera to identify a degree of similarity for each corresponding image pair, wherein corresponding images are those associated with a same respective display and capture time; and execute a login to the auxiliary device with the user profile in response to a determination that the degree of similarity meets or exceeds a threshold value for at least a subset of the plurality of corresponding image pairs.

Figure 8:
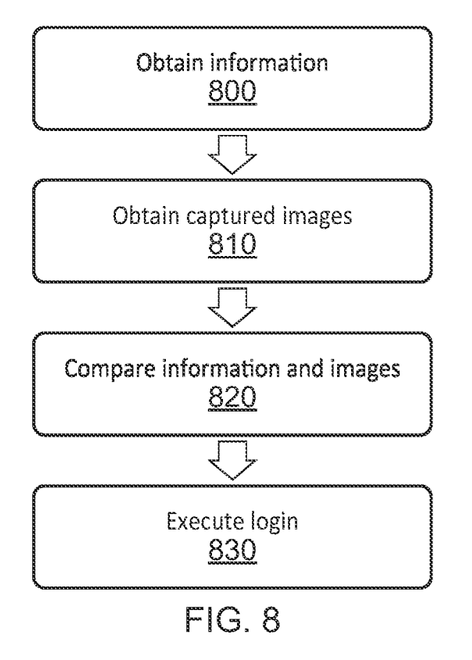
FIG. 8 schematically illustrates a method for performing a login process for a user profile at an auxiliary device.

FIG. 8 schematically illustrates a method for performing a login process for a user profile at an auxiliary device.

A step 800 comprises obtaining information associated with each of a plurality of image frames displayed by a first device, the first device being logged in with the user profile.

A step 810 comprises obtaining a plurality of images captured by a camera associated with the auxiliary device.

A step 820 comprises comparing the information associated with plurality of image frames displayed by the first device with a plurality of corresponding images captured by the camera to identify a degree of similarity for each corresponding image pair, wherein corresponding images are those associated with a same respective display and capture time.

A step 830 comprises executing a login to the auxiliary device with the user profile in response to a determination that the degree of similarity meets or exceeds a threshold value for at least a subset of the plurality of corresponding image pairs.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for performing a login process for a user profile at an auxiliary device, the system comprising: a first obtaining unit configured to obtain information associated with each of a plurality of image frames displayed by a first device, the first device being logged in with the user profile; a second obtaining unit configured to obtain a plurality of images captured by a camera associated with the auxiliary device; a comparison unit configured to compare the information associated with plurality of image frames displayed by the first device with a plurality of corresponding images captured by the camera to identify a degree of similarity for each corresponding image pair, wherein corresponding images are those associated with a same respective display and capture time; and an authentication unit configured to execute a login to the auxiliary device with the user profile in response to a determination that the degree of similarity meets or exceeds a threshold value for at least a subset of the plurality of corresponding image pairs.
2. A system according to clause 1, wherein the plurality of image frames and the plurality of images are each sets of non-consecutive displayed/captured images.
3. A system according to any preceding clause, wherein the first obtaining unit is configured to obtain the plurality of image frames as the information associated with each of the plurality of image frames.
4. A system according to any preceding clause, wherein the plurality of image frames are associated with a video game.
5. A system according to clause 4, wherein: the first obtaining unit is configured to obtain a game state associated with each of the plurality of image frames, and/or one or more descriptors and/or parameters representative of the game state, and the comparison unit is configured to identify a game state, and/or one or more descriptors and/or parameters representative of the game state, associated with each of the plurality of images captured by the camera.
6. A system according to any of clauses 1 to 4, wherein the degree of similarity is determined on the basis of the number of pixels that match between corresponding images.
7. A system according to any of clauses 1 to 4 or clause 6, wherein the degree of similarity is determined on the basis of the number of image features that match between corresponding images.
8. A system according to any preceding clause, wherein the authentication unit is configured to select a threshold in dependence upon a level of access to the user profile that is requested.
9. A system according to any preceding clause, wherein the authentication unit is configured to execute a login to the auxiliary device with the user profile in dependence upon a determination that the degree of difference between the plurality of image frames displayed by the first device is equal to or above a threshold value.
10. A system according to any preceding clause, wherein the plurality of image frames displayed by the first device comprise one or more identifiers associated with the user profile.

11. A system according to any preceding clause, wherein the number of image frames in the plurality of image frames is dependent upon a network connection associated with either or both of the first device and the auxiliary device.

12. A system according to any preceding clause, wherein the auxiliary device is a mobile phone or tablet computer and the first device is a games console.

13. A method for performing a login process for a user profile at an auxiliary device, the method comprising: obtaining information associated with each of a plurality of image frames displayed by a first device, the first device being logged in with the user profile; obtaining a plurality of images captured by a camera associated with the auxiliary device; comparing the information associated with plurality of image frames displayed by the first device with a plurality of corresponding images captured by the camera to identify a degree of similarity for each corresponding image pair, wherein corresponding images are those associated with a same respective display and capture time; and executing a login to the auxiliary device with the user profile in response to a determination that the degree of similarity meets or exceeds a threshold value for at least a subset of the plurality of corresponding image pairs.

14. Computer software which, when executed by a computer, causes the computer to carry out the method of clause 13.

15. A non-transitory machine-readable storage medium which stores computer software according to clause 14.

The invention claimed is:

1. A system for performing a login process for a user profile at an auxiliary device, the system comprising:
   one or more processors; and
   one or more non-transitory media operably connectable to the one or more processors and storing instructions that, when executed, cause the one or more processors to perform operations comprising:
      obtaining information associated with each of a plurality of image frames displayed by a first device, the first device being logged in with the user profile, wherein the plurality of image frames are associated with a video game, and wherein the information associated with each of the plurality of image frames are related to a game state of the video game, and/or one or more descriptors and/or parameters representative of the game state;
      obtaining a plurality of images captured by a camera associated with the auxiliary device;
      comparing the information associated with plurality of image frames displayed by the first device with a plurality of corresponding images captured by the camera to identify a degree of similarity for each corresponding image pair, wherein corresponding images are those associated with a same respective display and capture time; and
      executing a login to the auxiliary device with the user profile in response to a determination that the degree of similarity meets or exceeds a threshold value for at least a subset of the plurality of corresponding image pairs.

2. The system of claim 1, wherein the plurality of image frames and the plurality of images are each sets of non-consecutive displayed/captured images.

3. The system of claim 1, wherein the operations further comprise obtaining the plurality of image frames as the information associated with each of the plurality of image frames.

4. The system of claim 1, wherein:
   the operations further comprise identifying a game state, and/or one or more descriptors and/or parameters representative of the game state, associated with each of the plurality of images captured by the camera.

5. The system of claim 1, wherein the degree of similarity is determined on the basis of the number of pixels that match between corresponding images.

6. The system of claim 1, wherein the degree of similarity is determined on the basis of the number of image features that match between corresponding images.

7. The system of claim 1, wherein the authentication unit is configured to select a threshold in dependence upon a level of access to the user profile that is requested.

8. The system of claim 1, wherein the operations further comprise executing a login to the auxiliary device with the user profile in dependence upon a determination that the degree of difference between the plurality of image frames displayed by the first device is equal to or above a threshold value.

9. The system of claim 1, wherein the plurality of image frames displayed by the first device comprise one or more identifiers associated with the user profile.

10. The system of claim 1, wherein the number of image frames in the plurality of image frames is dependent upon a network connection associated with either or both of the first device and the auxiliary device.

11. The system of claim 1, wherein the auxiliary device is a mobile phone or tablet computer and the first device is a games console.

12. A method for performing a login process for a user profile at an auxiliary device, the method comprising:
   obtaining information associated with each of a plurality of image frames displayed by a first device, the first device being logged in with the user profile, wherein the plurality of image frames are associated with a video game, and wherein the information associated with each of the plurality of image frames are related to a game state of the video game, and/or one or more descriptors and/or parameters representative of the game state;
   obtaining a plurality of images captured by a camera associated with the auxiliary device;
   comparing the information associated with plurality of image frames displayed by the first device with a plurality of corresponding images captured by the camera to identify a degree of similarity for each corresponding image pair, wherein corresponding images are those associated with a same respective display and capture time; and
   executing a login to the auxiliary device with the user profile in response to a determination that the degree of similarity meets or exceeds a threshold value for at least a subset of the plurality of corresponding image pairs.

13. A non-transitory machine-readable storage medium which stores computer software which, when executed by a computer, causes the computer to perform a method for performing a login process for a user profile at an auxiliary device, the method comprising:
   obtaining information associated with each of a plurality of image frames displayed by a first device, the first device being logged in with the user profile, wherein the plurality of image frames are associated with a video game, and wherein the information associated with each of the plurality of image frames are related to a game state of the video game, and/or one or more descriptors and/or parameters representative of the game state;

obtaining a plurality of images captured by a camera associated with the auxiliary device;

comparing the information associated with plurality of image frames displayed by the first device with a plurality of corresponding images captured by the camera to identify a degree of similarity for each corresponding image pair, wherein corresponding images are those associated with a same respective display and capture time; and executing a login to the auxiliary device with the user profile in response to a determination that the degree of similarity meets or exceeds a threshold value for at least a subset of the plurality of corresponding image pairs.

* * * * *